Figure 1:
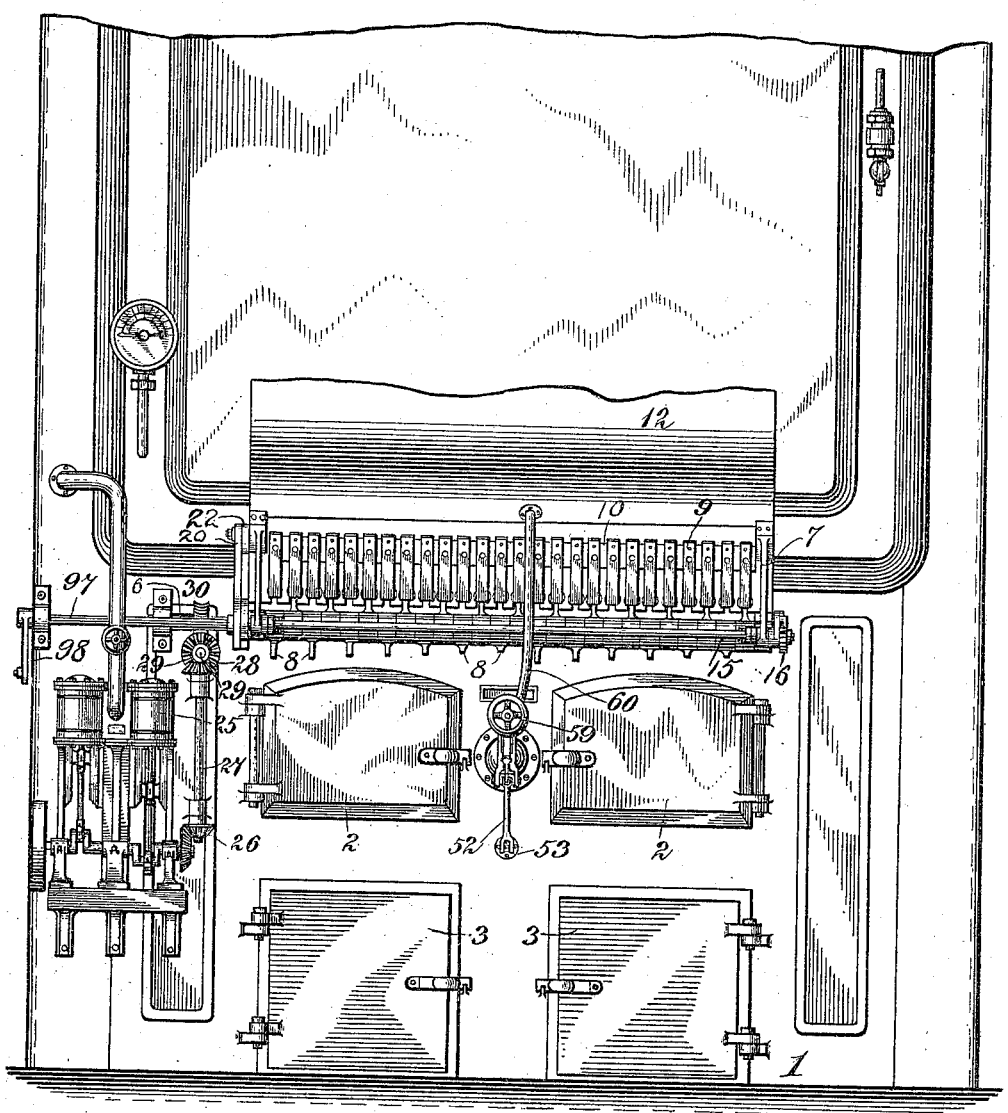

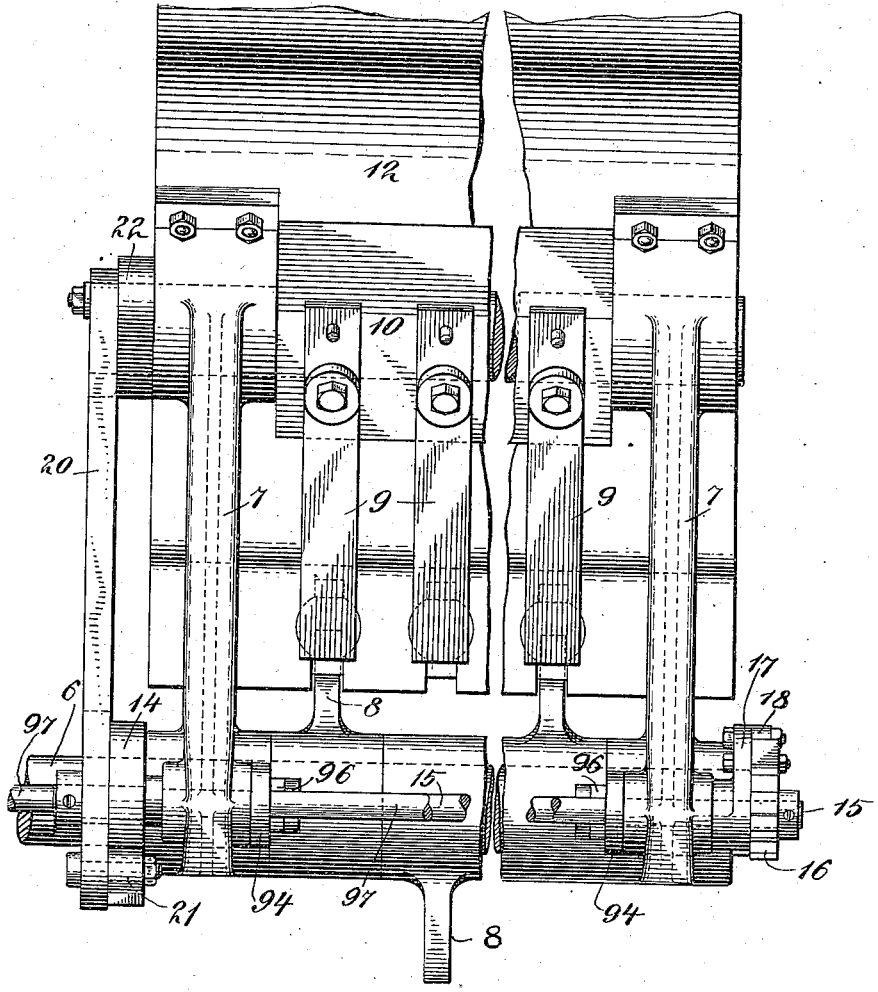

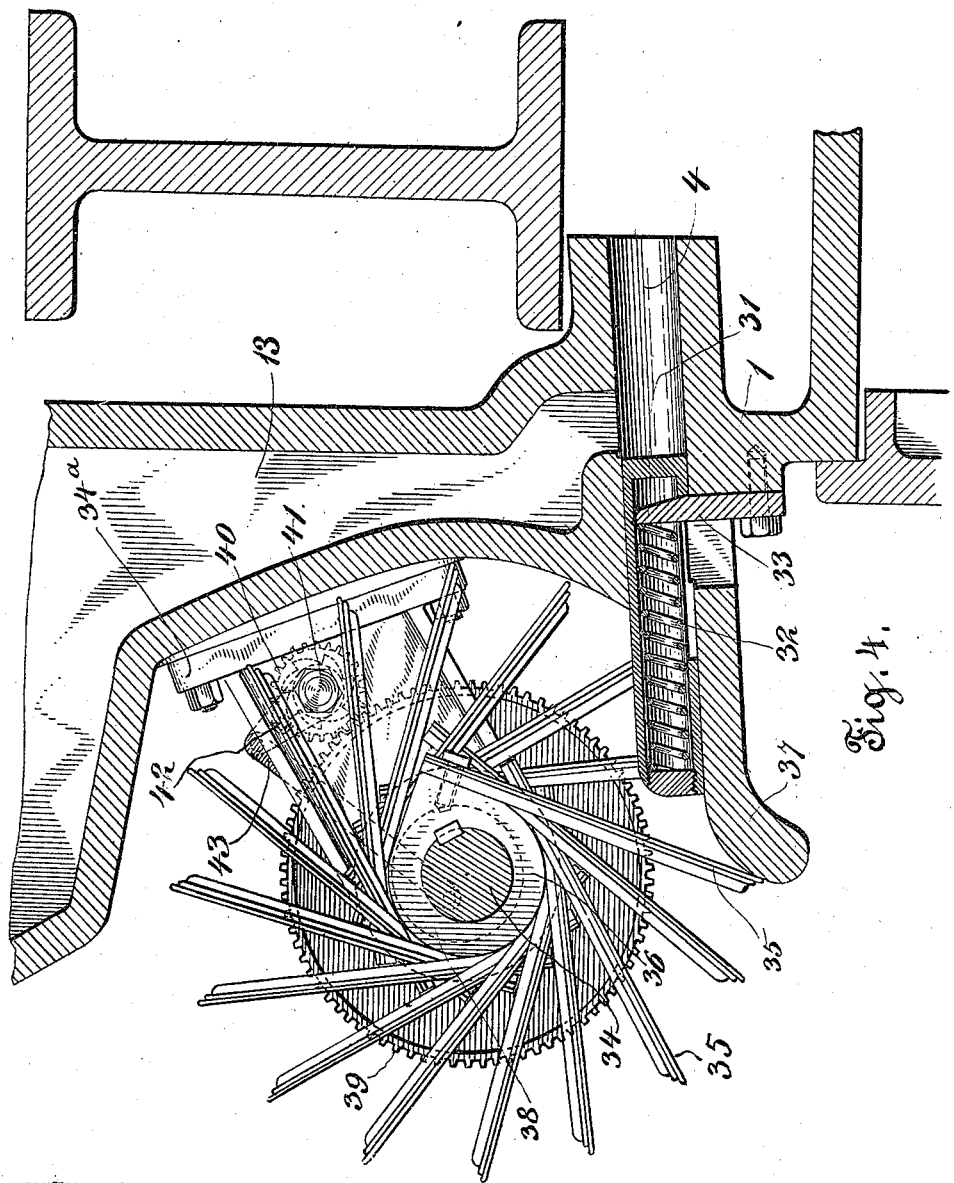

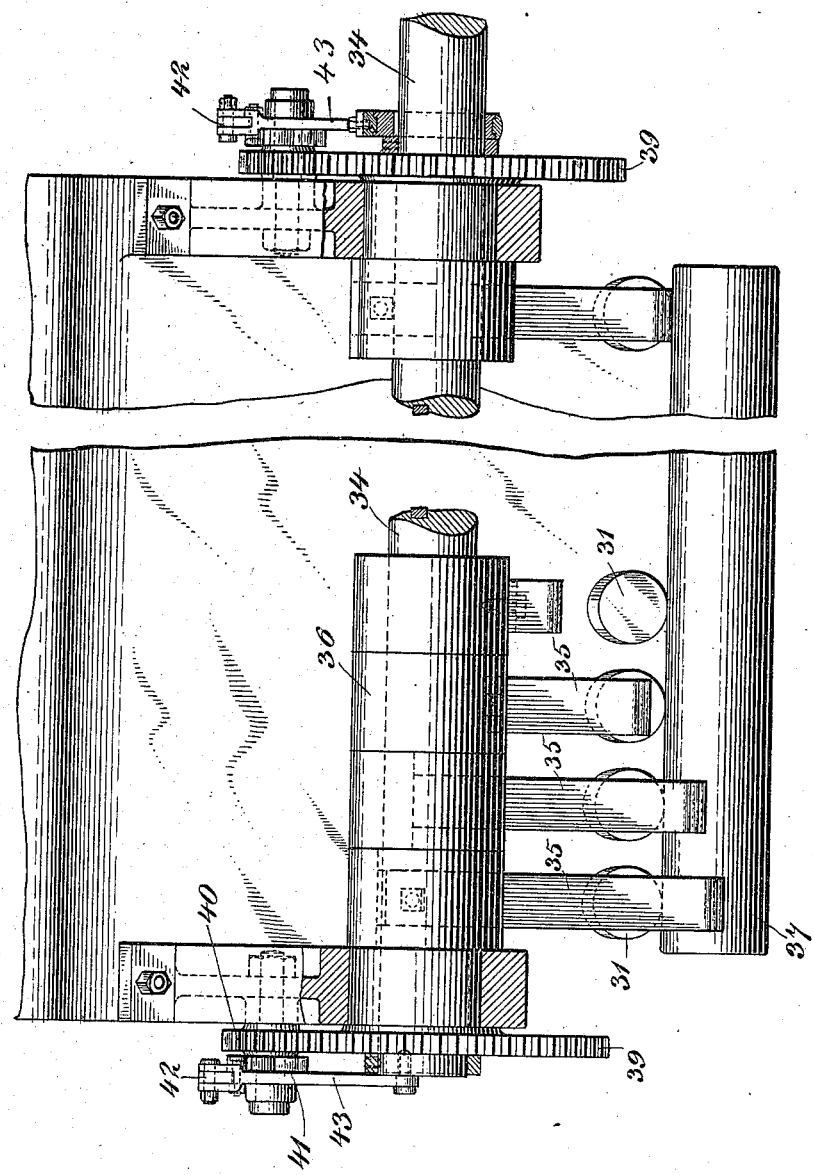

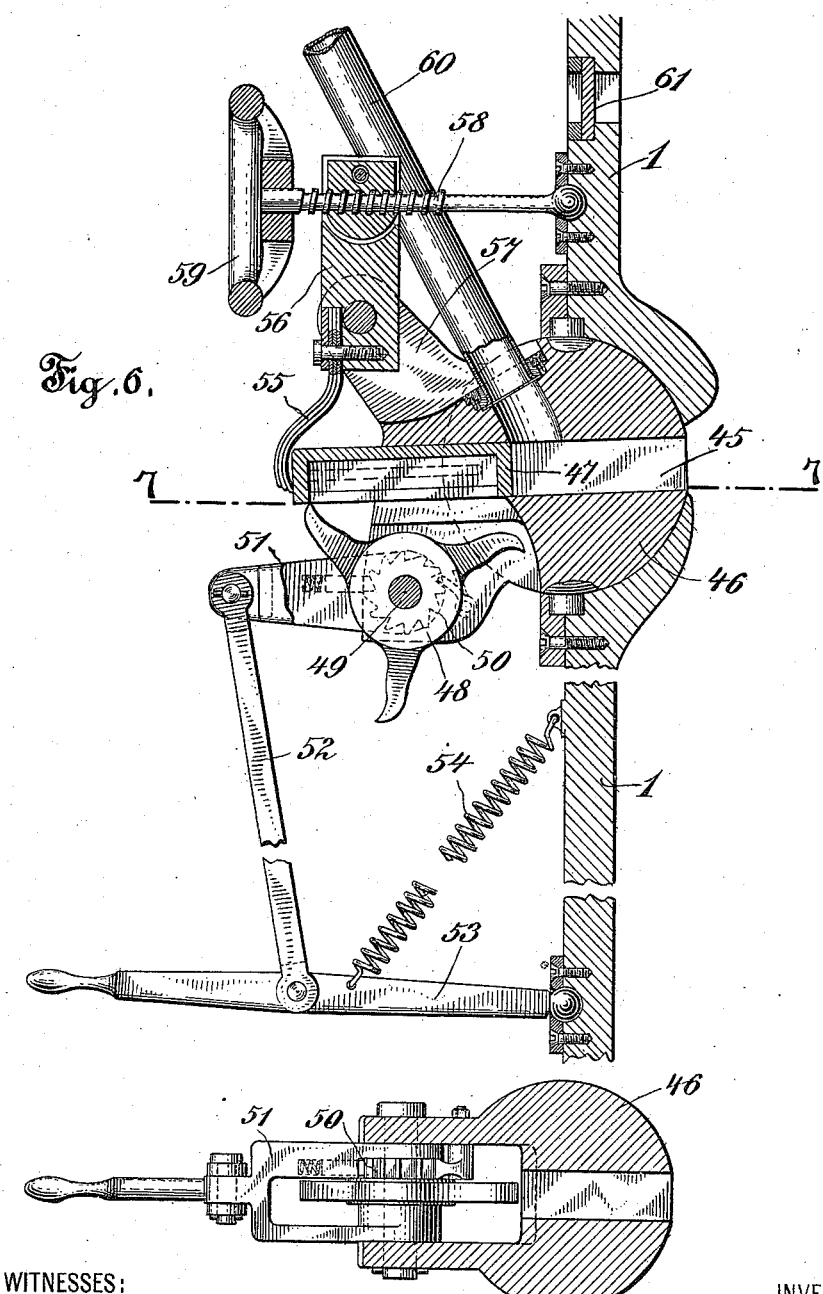

A. A. E. STERZING.
FURNACE.
APPLICATION FILED NOV. 20, 1902. RENEWED SEPT. 13, 1904.
963,088.
Patented July 5, 1910.
10 SHEETS—SHEET 8.
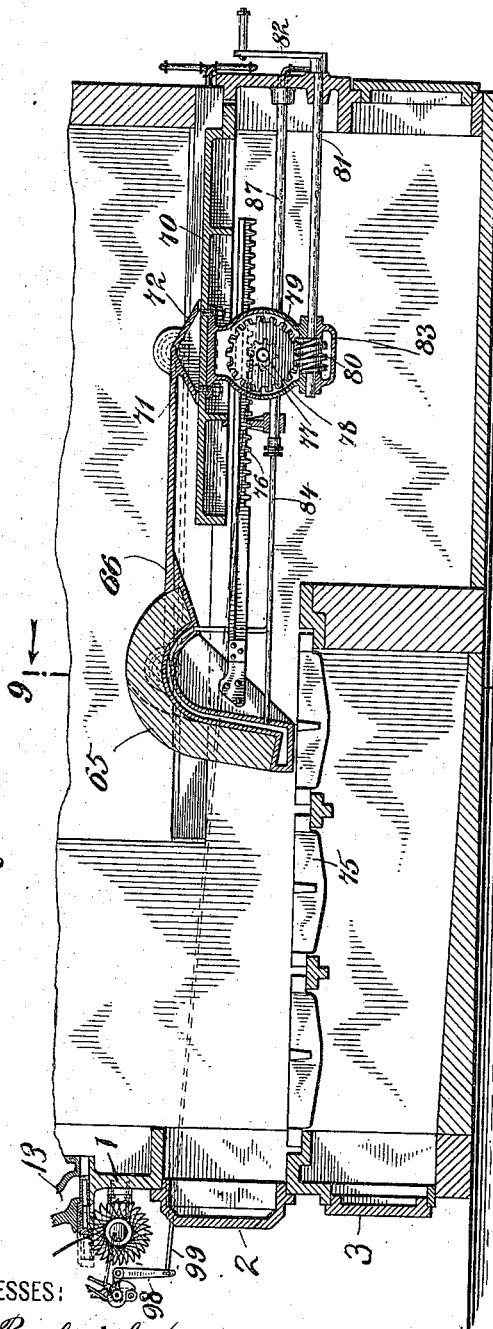
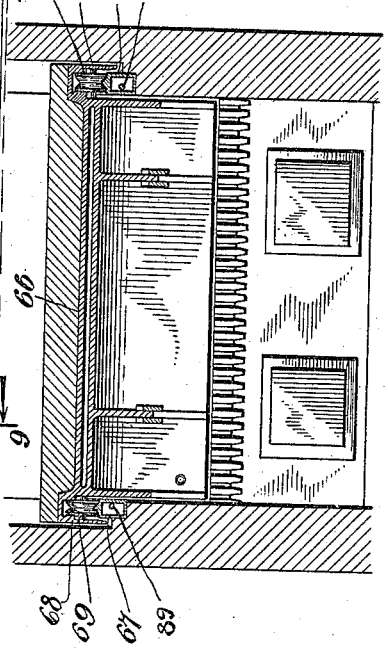
WITNESSES:
INVENTOR
Albert A. E. Sterzing
BY
ATTORNEY

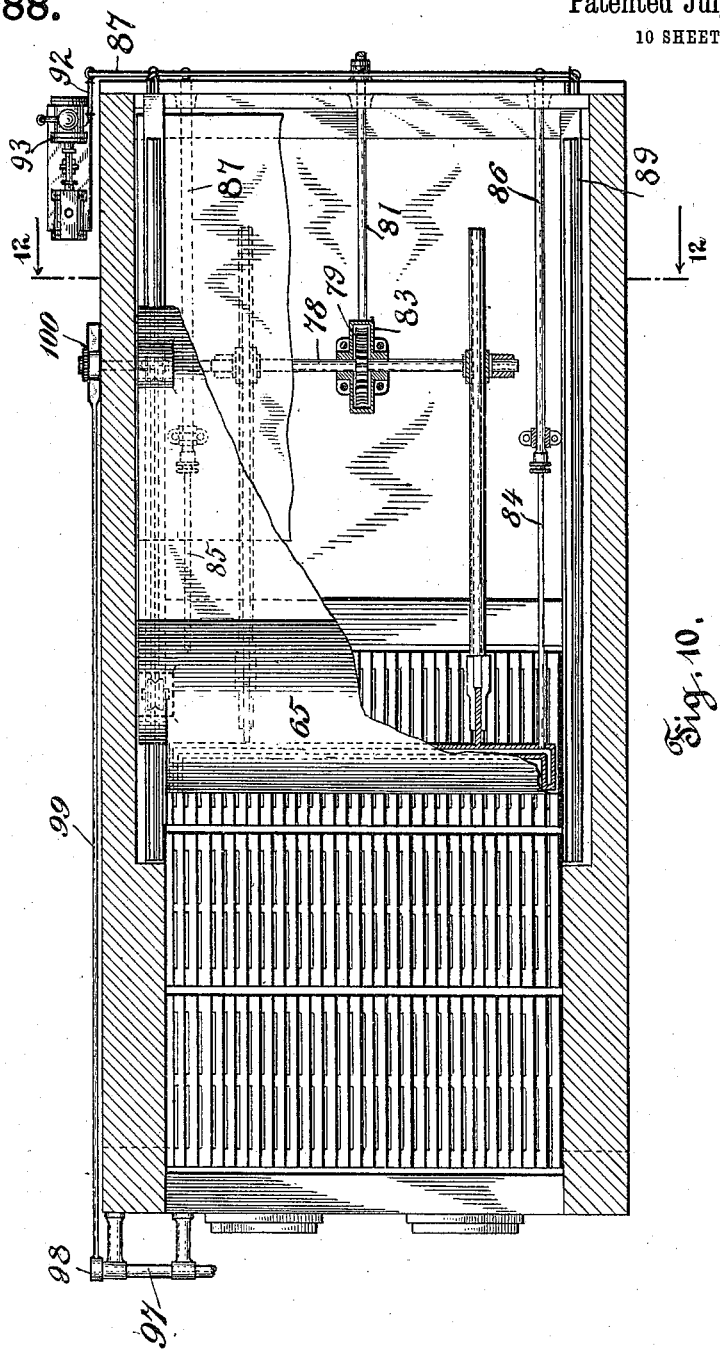

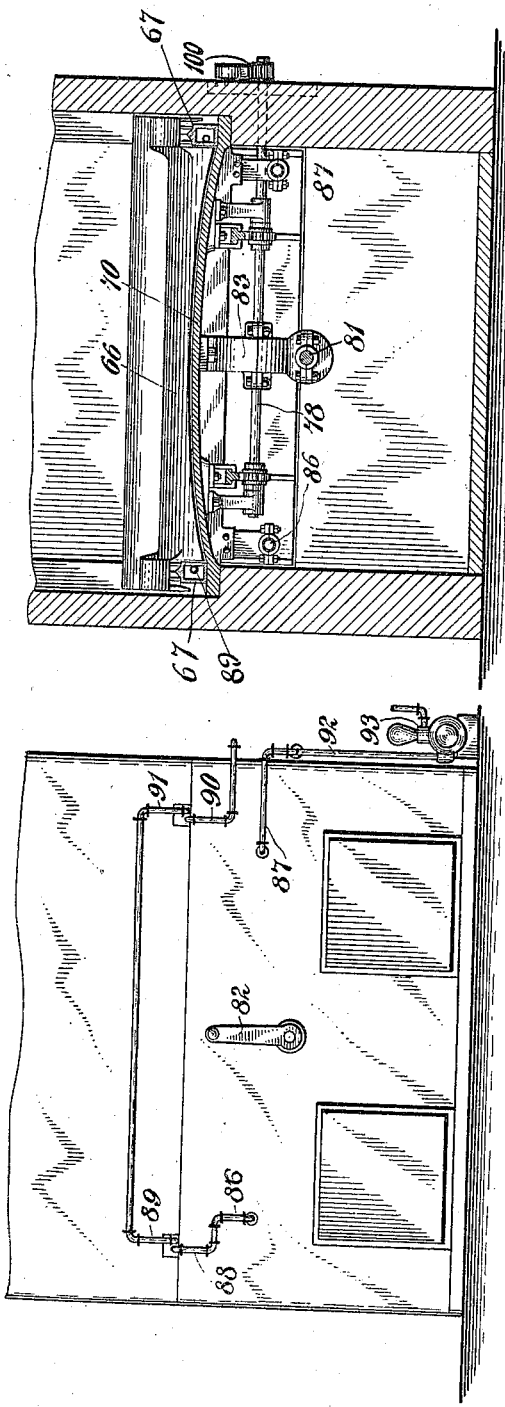

UNITED STATES PATENT OFFICE.

ALBERT A. E. STERZING, OF NEW YORK, N. Y.

FURNACE.

963,088.  Specification of Letters Patent.  Patented July 5, 1910.

Application filed November 20, 1902, Serial No. 132,102. Renewed September 13, 1904. Serial No. 224,324.

*To all whom it may concern:*

Be it known that I, ALBERT A. E. STERZING, a subject of the King of Great Britain, and a resident of the city, county, and State of New York, have invented certain new and useful Improvements in Furnaces, of which the following is a specification.

My invention relates to furnaces for burning coal or similar solid fuel and more particularly to furnaces adapted for heating steam boilers.

One object of my invention is to provide an automatic or mechanical stoker whereby the fuel is continuously supplied to the fire in small quantities and is uniformly distributed over the entire grate area so as not to materially check the combustion.

Another object of my invention is to provide a mechanical stoker in which provision is made for heating the fuel before it is applied to the fire, the checking of the combustion and the production of smoke being thereby further prevented.

Another object of my invention is to provide a construction which does not interfere with the firing of the furnace by hand in the ordinary way.

Another object of my invention is to provide an auxiliary stoking mechanism whereby without opening the furnace so as to admit cold air, fuel may be supplied to any part of the fire in such quantities as may be required to prevent the formation of air holes or thin spots in the fire.

Other objects of my invention are to provide means whereby the effective grate surface on the fire area may be varied at will to correspond to the variations in the demand for heat; also to provide means whereby the area of distribution of the mechanical stoker is automatically varied to correspond to the changes in the effective area of the grate.

With these and other objects in view, my invention consists, first, in the combination, in a furnace, of a plurality of fuel projecting devices arranged to deliver fuel to different parts of the furnace, and means for operating said devices with varying degrees of force whereby the fuel is supplied in small quantities to all parts of the furnace.

In accordance with the best embodiment of my invention the fuel projecting devices consist of a number of open ended fuel receptacles, means for supplying fuel to said receptacles, and reciprocating plungers for projecting the fuel from the receptacles into the furnace. In accordance with the best construction means are provided for retracting the plungers successively, springs for driving them inwardly to project the fuel on to the fire, and means for varying the force of the springs whereby the fuel is projected to different distances from each receptacle.

My invention also consists in the combination, in a furnace, of automatically operated means for projecting the fuel in small quantities to different parts of the furnace, and means under the control of the operator for projecting fuel in small quantities to any desired part of the furnace. In accordance with the best embodiment of this feature of the invention the automatically operated fuel projecting devices are continuously operated to project the fuel to certain definite parts of the furnace, and the hand controlled projecting device is constructed to enable the fuel to be projected to any part of the furnace without admitting cold air thereto.

My invention also consists in the combination, in a furnace, of means for projecting fuel into the furnace, a movable wall for varying the effective area of the furnace and connections between the movable wall and the projecting devices whereby the distance to which the fuel is projected into the furnace varies directly with the area thereof. In accordance with the best embodiment of this feature of the invention the means for projecting the fuel into the furnace consists of a number of fuel projecting devices, each being automatically operated to project the fuel in small quantities to varying distances in the furnace and the connections between the movable wall and the fuel projecting devices are such that the distance to which the fuel is projected varies in proportion to the area of the furnace.

My invention also consists in the combination, in a furnace, of a suitable grate, a wall movable back and forth over a part of said grate and means for moving said wall to vary the effective area of the grate.

My invention also consists in certain other improvements, combinations and features of construction, as will more fully hereinafter appear.

The drawings, which are referred to herein and form a part hereof, illustrate one embodiment of my invention, together with a modification of one of the features thereof, the same serving in connection with the description herein to explain the principles of the invention and the best mode contemplated by me of applying those principles.

Figure 2:
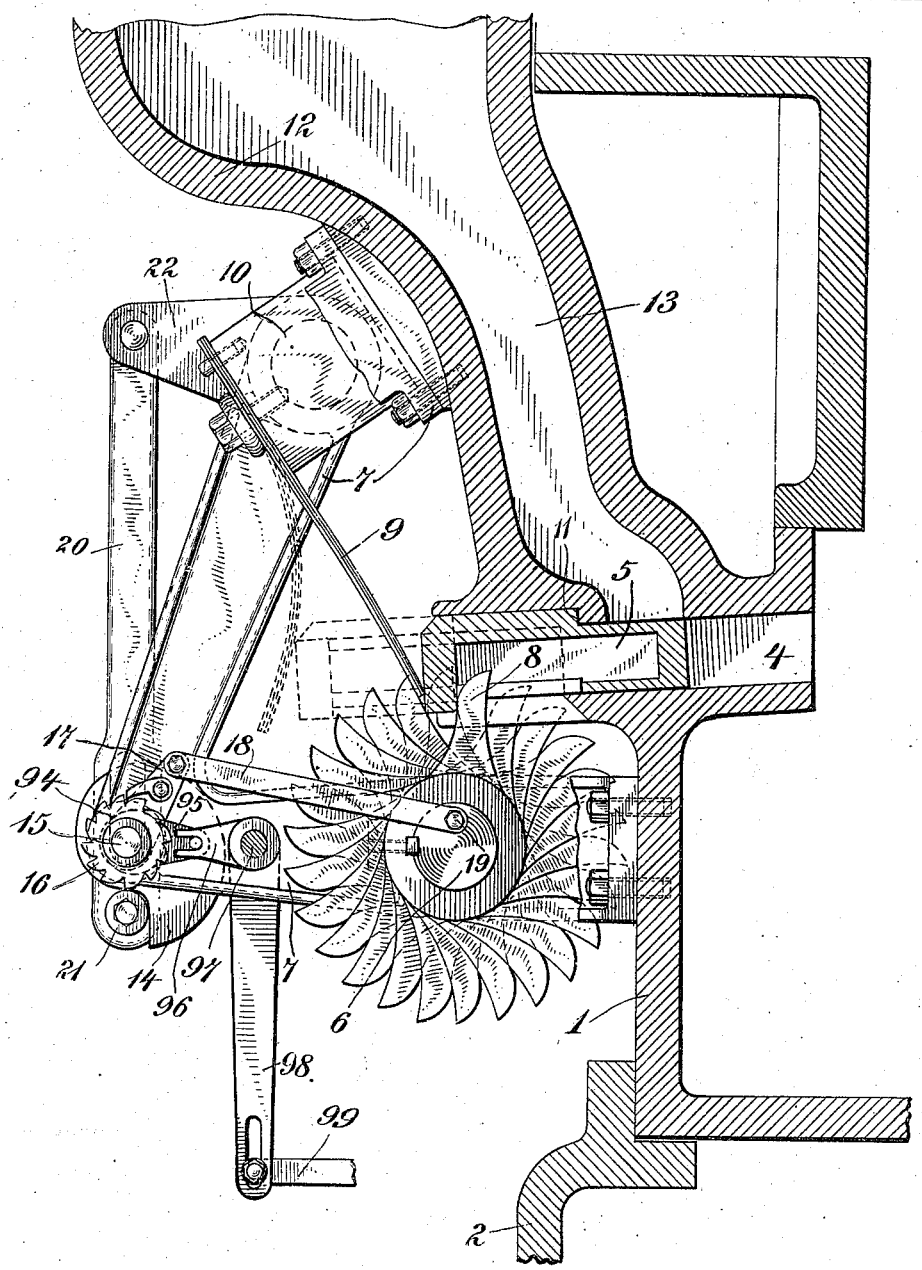
Figure 5:
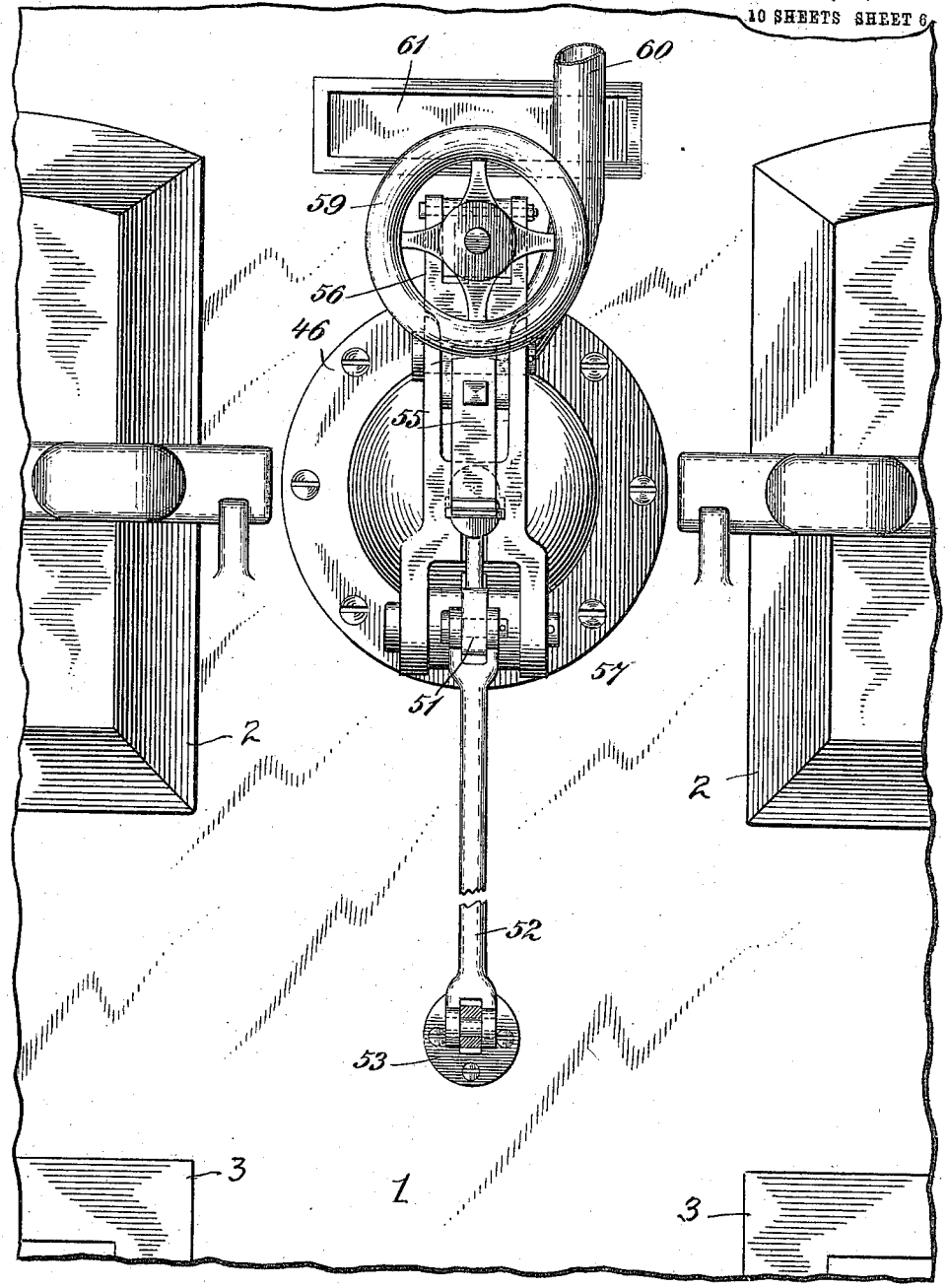

Of the drawings, Figure 1 is a front elevation of a steam boiler furnace constructed in accordance with my invention; Fig. 2 is a sectional view of a part of the furnace illustrating the construction of the fuel projecting devices and the operating mechanism therefor on a larger scale; Fig. 3 is a front elevation of the same; Fig. 4 is a view similar to Fig. 2, illustrating a modified construction of the fuel projecting devices; Fig. 4ª is a front elevation of the same; Fig. 5 is a front elevation of the hand controlled devices whereby the fuel may be projected to any desired part of the furnace; Fig. 6 is a vertical sectional view of the same; Fig. 7 is a transverse section of the same taken on the line 7—7 of Fig. 6 with certain parts removed to better illustrate the construction; Fig. 8 is a vertical longitudinal section of a furnace constructed in accordance with my invention; Fig. 9 is a transverse section of the same, taken on line 9—9, Fig. 8 and looking in the direction of the arrows; Fig. 10 is a sectional plan view of the construction shown in Fig. 8; Fig. 11 is a rear elevation of the same, and Fig. 12 is a transverse section taken on the line 12—12, Fig. 10 and looking in the direction of the arrows.

Like reference numerals refer to like parts wherever they occur throughout the several views.

In the embodiment of my invention illustrated 1 represents the front frame of a steam boiler furnace, which as to its general features may be of the usual construction, 2 representing the ordinary furnace doors and 3, 3, the doors to the ash pit. In accordance with the best embodiment of the invention the automatic stoking mechanism is arranged above the furnace doors so as to project the fuel into the furnace from a point near the top thereof. As shown a series of small fuel receptacles 4 are formed directly in the upper part of the front wall 1 of the furnace. These receptacles 4 are open at their inner ends and for the purpose of projecting the fuel therefrom each of them is provided with a suitable ejecting device, that shown consisting of a reciprocating plunger 5 fitted to enter the receptacle from the front and to move a suitable distance therein toward the inner open end thereof.

Any suitable means may be provided to retract the plungers 5 and suddenly move them forward with a suitable degree of force to project the fuel to the desired distance in the furnace. In accordance with the preferred construction a cam shaft 6 is journaled in a suitable bracket 7, below the outer ends of the plungers 5, said shaft being provided with a suitable tappet cam 8 for each of the plungers. As shown each of these plungers 5 is slotted on its under surface so as to form an abutment adapted to be engaged by a corresponding cam 8 in such a manner that the cam will draw the plunger out of the receptacle a certain distance and then release the plunger so that it may be driven back into the receptacle with any desired degree of force. The means shown for driving the plungers inwardly consists of a spring 9, one for each of the plungers, said springs being preferably formed of two or more plate springs which are firmly bolted one on top of the other to a rectangular rock-shaft 10 journaled at a suitable point above the plungers in the bracket 7. Each of the plungers 5 is provided with a stop shoulder 11, which engages a corresponding shoulder in the rear end of the receptacle 4, so as to limit the inward movement of the plunger. The coal is supplied to the receptacles 4 from a suitable hopper 12 by vertical passages 13, which communicate with the receptacles at the upper sides thereof. The passages 13 are preferably given a suitable offset at their lower ends, so that the fuel will not be forced into the receptacles by the entire weight of the body thereof in the hopper 12. The passages 13 moreover preferably communicate with the receptacles 4 at such a point that the supply of fuel will be cut off from the receptacles when the plungers 5 are at the inward limits of their movement. By reason of this construction the fuel is permitted to drop into the receptacles in limited quantities and only during the time that the plungers are retracted by their respective cams.

For the purpose of automatically varying the force with which each of the plungers is driven into its receptacle so that the successive charges of fuel delivered from each receptacle is projected to different points in the furnace, means are provided for giving the shaft 10 a slight rocking movement. Any suitable means may be provided for this purpose. As shown a cam 14 is provided for this purpose, said cam being fixed to a shaft 15 which is journaled at its opposite ends in the brackets 7 and is given an intermittent rotary movement by means of a ratchet 16 which is operated from the cam shaft 6 by a pawl arm 17 and link 18 connecting the pawl arm with an eccentric pin 19 on the end of the shaft 6. The cam 14 is connected with the rock shaft 10 by means of a link 20, which engages the cam by means of a stud-roller 21 at one end and is pivoted at the other end to an arm 22 affixed to one end of the shaft 10. It follows from this construction that as the shaft 6 is rotated, the cam 14 will be slowly revolved so as to draw the arm 22 on the shaft 10 downwardly and thereby gradually increase the tension of the springs 9, so that with each successive operation of the plungers they will be forced inwardly with a little greater force, thus projecting the fuel farther and farther into the furnace until the cam has made one complete revolution, whereupon the tension of the springs will be reduced so that the plungers will operate to again project the fuel into the front end of the furnace. The cam shaft 6 may be rotated from any suitable source of power. As shown a small steam engine 25 is mounted on the front wall 1 of the furnace, the same being connected to the shaft 6 by the bevel gears 26, vertical shaft 27, bevel gears 28 and horizontal shaft 29, which carries a worm adapted to mesh with a worm wheel 30 on the shaft 6.

In Fig. 4 a modification of the means for operating the fuel ejecting plungers is shown. In accordance with this construction each of the plungers 31 is made hollow and is normally retained in its outer position by a spring 32 which is located within the plunger and is confined between its inner end and a stationary stop 33, carried by the front wall 1 of the furnace. For the purpose of forcibly moving the plungers inward to project the fuel into the furnace a shaft 34 is journaled at a suitable point above the line of plungers in brackets 34ª, said shaft being provided with a series of springs 35, one for each of the plungers. These springs preferably consist of two or more plate springs securely bolted at one end to suitable collars 36 fixed to the shaft 34. A curved abutment 37 is arranged below and in advance of the outer ends of the plungers 31 in position to engage the free ends of the springs 35 as the shaft 34 is revolved, so as to put the springs under a suitable degree of tension before they come into contact with the plungers 31. As the springs 35 come in contact with the outer ends of the plungers 31 they are freed from the abutments 37 so that their entire force is suddenly applied to the plungers 31, which are thus rapidly forced into the fuel receptacles, so as to project the fuel therefrom into the furnace. Any suitable means may be provided for the purpose of varying the force with which the springs 35 drive the plungers 31 inwardly. In accordance with the construction shown the shaft 34 is mounted in concentric bearings which are provided with gear wheels 39 adapted to mesh with pinions 40 carried on stub shafts 41 in the brackets 34ª. Each of the pinions 40 is intermittently rotated by means of a pawl and ratchet mechanism 42 which links are operated by means of links 43 eccentrically connected at the opposite ends of the shaft 34.

It will be seen that by reason of the fact that the receptacles 4 open into the furnace, they will become considerably heated, as will also the portions of the passages 13 which are adjacent to the said receptacles. The fuel will therefore become heated to a considerable extent before it is projected into the furnace, the checking of the combustion and the production of smoke where soft coal is used being thereby largely prevented. As the fire supplied by the mechanically operated stoker thus far described, or by any other mechanical stoker which delivers the fuel at fixed points in the furnace, will inevitably become more or less uneven owing to the fact that the rate of combustion in all parts of the furnace is seldom uniform, means are provided in accordance with the best embodiment of my invention whereby fuel in small quantities may be projected to any desired part of the furnace without opening the furnace doors or otherwise admitting cold air thereto.

One embodiment of this device is illustrated in Figs. 5, 6 and 7. As shown a small fuel receptacle 45 is provided in a member 46 which as shown is substantially spherical in form and is freely journaled by means of suitable trunnions on a vertical diametric axis in the front wall 1 of the furnace. A plunger 47 is arranged to enter the receptacle 45 from its outer end. Any suitable means may be provided to operate the plunger. As shown the plunger is retracted by a tappet cam 48 journaled on a pin 49 carried by the member 46 below the plunger 47. For the purpose of rotating the cam by hand the cam is provided with a ratchet wheel 50, which is engaged by a pawl on the oscillating arm 51, said arm being connected by a link 52 with a hand lever 53, which is fulcrumed by a universal joint on the front wall 1 of the furnace and is normally held in its upper position by a tension spring 54. The plunger 47 is driven inwardly, when released by the cam 48, by a plate spring 55, secured at one end to an arm 56, which, with the object in view of varying the tension of the spring, is pivoted in suitable lugs 57 formed on the member 46 and is controlled by screw 58, which is connected to the front wall 1 of the furnace by a universal joint and is provided with a suitable hand wheel 59. The fuel is supplied to receptacle 45 by a flexible pipe 60, which communicates at its upper end with the hopper 12. In operation the operator grasps the hand wheel 59 in one hand and the lever 53 in the other. By moving these parts to the right or left the receptacle 45 may be directed to any part of the furnace and then by moving the lever 53 up and down and by turning the hand wheel, the fuel may be projected so as to fall at any desired distance from the front of the furnace. In order that the operator may see where the fuel is being projected, a suitable window or peep hole 61 is provided at a convenient point in the front wall 1 of the furnace.

It is often desirable in furnaces and especially in furnaces for heating steam boilers, to gradually vary the quantity of heat developed. With this object in view, I have, in accordance with one feature of my invention, provided a movable wall whereby the effective grate surface of the furnace may be varied. One embodiment of this feature of the invention is illustrated in Figs. 8 to 12 inclusive. As shown the rear wall 65 is mounted on a carriage frame 66, which is arranged to move back and forth in the rear part of the furnace on suitable side tracks 67. As shown, this carriage consists of a casting which is provided at its forward part with a seat for a suitable protecting coating of refractory material. At its sides the casting 66 is provided with downwardly extending lips 68 which overlap the track 67, suitable recesses being provided in which the anti-friction rollers 69 are journaled. Directly beneath the rear end of carriage 66 is located a stationary wall 70, which is preferably somewhat arched transversely of the furnace, as illustrated in Fig. 12. With the object in view of making an air tight connection between the wall 70 and the carriage 66, the rear end of the latter is provided with forwardly and rearwardly tapering portions 71 and 72, which are adapted to plow through the ashes deposited on the wall 70 and form transverse piles of the ashes which will act to prevent leakage of air in the furnace gases. The depending lips 68 at the outer sides of the carriage will have a similar effect in the recesses formed between the tracks 67 and the sides of the furnace.

For the purpose of moving the carriage 66 backward and forward so as to carry the wall 65 more or less over the surface of the grate 75, any suitable means may be provided. As shown a pair of racks 76 are connected at their forward ends to the carriage 66 and are arranged to mesh with a pair of pinions 77 carried by the transverse shaft 78. The shaft 78 is provided near its center with a worm wheel 79, which is engaged by a worm 80 carried by the rearwardly extending shaft 81, having at the rear of the furnace a hand crank 82. The shaft 78 is journaled in suitable brackets depending from the partition 70 and the worm wheel 79 and worm 80 are preferably inclosed in any suitable casing 83 also supported from the partition 70. For the purpose of keeping the forward part of the carriage 66 and the tracks 67 properly cooled, both these parts are preferably made hollow and are connected to a suitable water circulating system. As shown the chamber in the forward part of the carriage 66 is provided with the inlet and outlet pipes 84 and 85, which are arranged to slide longitudinally in the stationary supply and delivery pipes 86 and 87. Each of the tracks 67 is also provided with supply and delivery pipes 88, 89 and 90 and 91 respectively, one or the other of these pipes being extended to near the forward part of the respective tracks. With a view of economy in water and heat I preferably connect these water circulating systems together and pass the water which is fed to the boiler through them. To this end the delivery pipe 92 of the feed pump 93 is connected to the feed pipe 87, the delivery pipe 86 is connected to the feed pipe 88, the delivery pipe 89 is connected to the feed pipe 91 and the delivery pipe 90 is connected to the feed pipe of the boiler, not shown.

In order that the operation of the mechanical stoker may be modified so as to evenly supply fuel to the effective grate area irrespective of the position of the movable wall 65, suitable connections are provided between the said wall and the controlling devices of the stoker. Any suitable connection may be provided for this purpose. In accordance with the construction shown the cam shaft 15 in the form of the device shown in Figs. 1, 2 and 3 is mounted in eccentric bearings 94 having inwardly projecting arms 95 pivotally connected with a corresponding pair of arms 96 carried by transverse shaft 97 journaled in the brackets 7. The shaft 97 is extended through to the side of the furnace, as illustrated in Figs. 1 and 10, where it is provided with a depending arm 98 which is adjustably connected at its lower end to a longitudinal bar 99 having at its rear end a suitable rack adapted to engage a pinion 100 on the end of the shaft 78, which to this end is extended through the side wall of the furnace, as shown in Fig. 10. It will be seen that as the wall 65 is moved in either direction the bar 99 will be given a corresponding movement which will be transmitted through the arm 98, shaft 97 and arms 95 and 96 to the eccentric bearings of the shaft 15. This shaft, together with the cam 14 will thus be raised and lowered as the wall 65 is moved backward and forward over the grate surface. The tension of the springs for all positions of the cam 14 will thus be correspondingly weakened and strengthened, so as to drive the plungers 5 inwardly with the force corresponding to the distance of the wall 65 from the forward end of the furnace. The distance through which the fuel is projected into the furnace will thus be varied in proportion to the effective grate area of the furnace.

As the operation of the various parts of the mechanism has been fully described in connection with the description of the construction thereof, further description of the operation is unnecessary.

My invention in its broader aspects is not limited to the particular construction shown nor to the particular construction by which the invention may be carried into effect, as many changes may be made in the details of the construction without departing from the main principles of the invention and without sacrificing its chief advantages.

Having thus described my invention, what I claim and desire to secure by Letters Patent, is:

1. In a mechanical stoker the combination with a furnace of a multiplicity of fuel-projecting devices arranged in a series from side to side of the furnace to deliver fuel to different parts thereof, and operating means constructed to cause each device to project fuel to different distances on successive operations, whereby fuel is supplied to all parts of the furnace in the form of a multiplicity of small charges.

2. In a mechanical stoker, the combination with a furnace of a multiplicity of fuel projecting devices arranged to deliver fuel to different parts of the furnace, and means for operating said devices in a regular rotation with varying degrees of force whereby fuel is continuously supplied in small quantities to various parts of the furnace.

3. In a mechanical stoker, the combination with a furnace, of a multiplicity of fuel projecting devices closely arranged in a row along one side of the furnace, and means for operating said devices with varying degrees of force whereby fuel is supplied in parallel lines covering the entire area of the furnace.

4. In a mechanical stoker, the combination with a furnace, of a multiplicity of fuel projecting devices closely arranged in a row along one side of the furnace, and means for operating said devices in a regular rotation with varying degrees of force whereby the fuel is continuously supplied in parallel lines covering the entire area of the furnace.

5. In a mechanical stoker, the combination with a furnace, of a number of fuel receptacles arranged in a row along one side of the furnace, means for supplying fuel to said receptacles, movable ejectors for projecting the fuel from the receptacles into the furnace, and means for operating said ejectors with varying degrees of force whereby fuel is supplied in small quantities to all parts of the furnace.

6. In a mechanical stoker, the combination with a furnace, of a number of small fuel receptacles arranged in a row along one side of the furnace, means for supplying fuel to said receptacles, reciprocating plungers for projecting the fuel from the receptacles into the furnace, and means for operating said plungers with varying degrees of force whereby fuel is supplied in small quantities to all parts of the furnace.

7. In a mechanical stoker, the combination with a furnace, of a number of small open-ended fuel receptacles arranged in a row along one side of the furnace, means for continuously supplying fuel to said receptacles, reciprocating plungers for projecting the fuel from the receptacles into the furnace, and means for operating said plungers in a regular rotation with varying degrees of force whereby the fuel is supplied in parallel lines covering the entire area of the furnace.

8. In a mechanical stoker, the combination with a furnace, of a number of fuel receptacles arranged in a row along one side of the furnace, means for supplying fuel to said receptacles, movable ejectors for projecting fuel from the receptacles into the furnace, means for retracting the ejectors, springs for driving the ejectors forward to project the fuel into the furnace, and means for varying the force of the springs to predetermined degrees whereby the fuel is supplied in parallel lines covering the entire area of the furnace.

9. In a mechanical stoker, the combination with a furnace, of a number of open-ended fuel receptacles arranged in a row along one side of the furnace, means for supplying fuel to said receptacles, reciprocating plungers for projecting fuel from said receptacles into the furnace, means for retracting the plungers, springs for driving the plungers inwardly to project the fuel into the furnace, and means for varying the force of the springs to predetermined degrees whereby the fuel is supplied in parallel lines covering the entire area of the furnace.

10. In a mechanical stoker, the combination with a furnace, of a number of open-ended fuel receptacles arranged in a row along one side of the furnace, means for supplying fuel to said receptacles through lateral openings therein, reciprocating plungers for projecting the fuel from the receptacles into the furnace said plungers being arranged to admit the fuel to said receptacles when retracted, means for retracting the plungers, means for driving said plungers inwardly to project the fuel into the furnace, and means for varying the rapidity of the inward movement of said plungers in a predetermined manner, whereby the fuel is supplied in small quantities to all parts of the furnace.

11. In a mechanical stoker, the combination with a furnace, of a number of open-ended fuel receptacles arranged in a row along one side of the furnace, means for supplying fuel to said receptacles through lateral openings therein, reciprocating plungers for projecting the fuel from the receptacles into the furnace said plungers being arranged to admit the fuel to said receptacles when retracted, means for retracting the plungers, springs for driving the plungers inwardly to project the fuel into the furnace, and means for varying the force of the springs to predetermined degrees whereby the fuel is supplied in parallel lines covering the entire area of the furnace.

12. In a mechanical stoker, the combination with a furnace, of a number of receptacles arranged in a row along one side of the furnace, means for supplying fuel to said receptacles, ejectors for projecting the fuel from the receptacles into the furnace, and a series of cams for operating said ejectors, said cams being arranged to operate said ejectors successively whereby the fuel is continuously supplied in small quantities to various parts of the furnace.

13. In a mechanical stoker, the combination with a furnace, of a number of open-ended receptacles arranged in a row along one side of the furnace, means for supplying fuel to said receptacles, reciprocating plungers for projecting fuel from the receptacles into the furnace, a series of cams for retracting said plungers, and springs for driving said plungers inwardly to project the fuel into the furnace.

14. In a mechanical stoker, the combination with a furnace, of a number of open-ended receptacles arranged in a row along one side of the furnace, means for supplying fuel to said receptacles, reciprocating plungers for projecting fuel from the receptacles into the furnace, a series of cams for retracting said plungers, and springs for driving said plungers inwardly to project the fuel into the furnace, said cams being set to operate said plungers successively in a regular rotation whereby the fuel is continuously supplied in small quantities to various parts of the furnace.

15. In a mechanical stoker, the combination with a furnace, of a number of open-ended receptacles arranged in a row along one side of the furnace, means for supplying fuel to said receptacles, reciprocating plungers for projecting the fuel from the receptacles into the furnace, a series of cams for retracting said plungers, springs for driving said plungers inwardly, and means for automatically varying the force of said springs, said cams being set to operate said plungers successively in a regular rotation.

16. In a mechanical stoker, the combination with a furnace, of a number of open-ended fuel receptacles arranged in a row along one side of the furnace, means for supplying fuel to said receptacles, reciprocating plungers for projecting fuel from the receptacles into the furnace, a series of cams for retracting said plungers, a series of springs for driving said plungers inwardly, a rock shaft to which said springs are secured, and means for automatically rocking said shaft to vary the force of the springs.

17. In a mechanical stoker, the combination with a furnace, of a multiplicity of fuel projecting devices arranged to deliver fuel to different parts of the furnace, means for automatically operating said projecting devices, and an independent projecting device adapted to deliver fuel into any part of the furnace at the will of the operator.

18. In a mechanical stoker, the combination with a furnace, of a multiplicity of fuel projecting devices arranged in a row along one side of the furnace, means for operating said devices in a regular rotation with varying degrees of force to deliver fuel in parallel lines covering the entire area of the furnace, and an independent fuel projecting device whereby fuel may be delivered to any part of the furnace at the will of the operator.

19. In a mechanical stoker, the combination with a furnace, of an open-ended fuel receptacle movably mounted in the wall of said furnace so as to direct the fuel in any direction therein, an ejector for projecting fuel from said receptacle into the furnace, means for supplying fuel to said receptacle, means for retracting said ejector, a spring for driving said ejector inwardly, and means under the control of the operator for varying the tension of said spring.

20. In a mechanical stoker, the combination with a furnace, of an open-ended fuel receptacle mounted in the wall of said furnace to swing laterally, means for supplying fuel to said receptacle, a reciprocating plunger for projecting the fuel from the receptacle into the furnace, a cam for retracting said plunger, a lever and connections for operating said cam, a spring for driving the plunger inwardly, a hand-operated means for varying the tension on said spring, said hand-operated means being so connected with the receptacle as to enable the receptacle to be moved in a lateral direction.

21. In a furnace, the combination with means for projecting fuel into the furnace, of a movable wall for varying the effective area of the furnace and connections between said wall and said fuel projecting device whereby the distance to which the fuel is projected is varied in accordance with the area of the furnace.

22. In a furnace, the combination with a plurality of devices for projecting fuel into the furnace in small quantities, of a movable wall for varying the effective area of the furnace, and connections between said wall and said fuel projecting devices, whereby the distance to which the fuel is projected is varied directly with the area of the furnace.

23. In a furnace, the combination with a plurality of devices for projecting fuel to different parts of the furnace, of means for operating said devices with varying degrees of force, a movable wall for varying the area of the furnace, and connections between said movable wall and the operating means for said projecting devices whereby the distance to which the fuel is projected is varied directly with the area of the furnace.

24. In a furnace, the combination with a plurality of open-ended fuel receptacles arranged in a row along one side of the furnace, of means for supplying fuel to said receptacles, ejecting devices for projecting fuel from said receptacles into the furnace, means for operating said ejecting devices with varying degrees of force whereby the fuel is projected from each receptacle varying distances into the furnace, a movable wall oppositely arranged with relation to said fuel receptacles, means for moving said wall to vary the effective area of the furnace and connections between the means for moving the wall and the means for operating the ejecting devices whereby the distances to which the fuel is projected into the furnace are varied in proportion to the area of the furnace.

25. In a mechanical stoker the combination with a furnace of a multiplicity of fuel-feeding devices arranged in a series extending from side to side of the furnace to deliver the fuel to different parts of the furnace, and operating means for said devices constructed to cause each of a plurality of them to project fuel to different distances in said furnace on successive operations, whereby fuel is supplied to all parts of the furnace in the form of a multiplicity of small charges.

26. The combination with a furnace, of a series of fuel projecting plungers arranged in a row along one side of the furnace, means for supplying fuel to each of the said plungers, a series of cams for retracting the plungers, springs for driving the said plungers forward to project the fuel into the furnace and means adapted to coöperate with the said plungers to cause the fuel projected by each to be deposited at different distances on successive operations, substantially as described.

27. In a mechanical stoker, the combination of a fuel projecting device, a tension means for giving to said device its fuel projecting movement, means for withdrawing said device in opposition to the tension means a uniform distance for each operation thereof and for releasing the same, and means, automatically operated, for adjusting the tension means to vary the speed without varying the length of the effective fuel projecting movement of said device in successive fuel projecting movements thereof.

28. In a mechanical stoker the combination of a fuel projecting device, a tension means for giving to said device its fuel projecting movement, means for withdrawing said device in opposition to the tension means and for releasing the same, and independent means, automatically operated, for adjusting the tension means to vary the speed of said device in successive fuel projecting movements thereof.

29. In a mechanical stoker, the combination of a fuel projecting device, a tension means for giving to said device its fuel projecting movement, means for withdrawing said device in opposition to the tension means a uniform distance for each operation thereof and for releasing the same, and means, automatically operated, for adjusting the tension means to gradually increase the tension of said means in successive operations of the fuel projecting device until its maximum tension is reached and then returning it to its minimum tension without varying the length of the effective fuel projecting movement of said device.

30. In a mechanical stoker, the combination of a fuel projecting device, a tension means for giving to said device its fuel projecting movement, means for withdrawing said device in opposition to the tension means a uniform distance for each operation thereof and for releasing the same, and independent means, automatically operated, to increase the tension of the tension means in successive operations of the fuel projecting device until its maximum tension is reached and then returning it to its minimum without varying the length of the effective fuel projecting movement of said device.

In testimony whereof, I have signed my name to this specification, in the presence of two subscribing witnesses.

ALBERT A. E. STERZING.

Witnesses:
J. H. FREEMAN,
EDWIN SEGER.